United States Patent Office 3,772,222
Patented Nov. 13, 1973

3,772,222
HIGHLY RESILIENT FLEXIBLE POLYURETHANE FOAMS HAVING IMPROVED TEAR STRENGTH
Collins W. Steward and Ronnie M. Pruitt, Lake Jackson, Tex., assignors to The Dow Chemical Company, Midland, Mich.
No Drawing. Filed Nov. 19, 1971, Ser. No. 200,573
Int. Cl. C08g 22/44
U.S. Cl. 260—2.5 A     8 Claims

ABSTRACT OF THE DISCLOSURE

Flexible highly resilient polyurethane foams having improved tear strengths are prepared by employing a selected modifier compound such as for example tris(2,3-dibromopropyl) phosphate, bis(1,3-dibromo-2-propyl) 2,3-dibromopropylphosphate, tris(1,3-dibromo-2-propyl) phosphite, bis(2-bromopropyl)2-bromopropyl phosphonate, dioctyl phthalate, diisodecyl phthalate, and trishalogenated propyl phosphate.

---

This invention relates to polyurethane foams and more particularly it relates to highly resilient flexible polyurethane foams having improved tear strength.

High resilient polyurethane foams are known, but they usually possess poor tear strength properties. Halogenated phosphorous-containing compounds have been employed to render polyurethane foams fire retardant, but the physical properties of the foams are either lowered or are unimproved.

It has now been unexpectedly discovered that highly resilient polyurethane foams can be prepared which possess improved tear strength by the addition thereto of certain halogenated phosphorus compounds.

The highly resilient polyurethane foams of the present invention are characterized as having a resiliency of at least about 50%, a modulus of at least about 2.3 and improved tear strength and resulting from subjecting to foaming conditions a composition which comprises (A) a primary hydroxyl-containing polyether triol having a molecular weight of from about 3000 to about 7000;
(B) an organic polyisocyanate consisting of (1) from about 90 to about 100% by weight of 2,4-toluene-diisocyanate, 2,6-toluenediisocyanate or mixtures thereof, and (2) from about 0 to about 10% by weight of an organic polyisocyanate;
(C) from about 1.5 to about 5 and preferably from about 2 to about 3 parts of water per 100 parts by weight of component (A);
(D) from about 0 to about 20 and preferably from about 5 to about 15 parts of a low boiling auxiliary blowing agent per 100 parts by weight of component (A);
(E) at least 2 and preferably from about 3 to about 5 parts of 4,4'-methylenebis(2-chloroaniline) per 100 parts of component (A);
(F) from about 0.5 to about 4.0 and preferably about 1.0 to about 2.5 parts by weight per 100 parts of component (A) of a tertiary amine catalyst;
(G) from about 0.005 to about 1.5 and preferably from about 0.01 to about 0.10 parts per 100 parts by weight of component (A) of a silicone oil cell control agent;
(H) from about 0.5 to about 15 and preferably from about 3 to about 5 parts per 100 parts by weight of component (A) of a tear strength improving modifier compound selected from the group consisting of tris (2,3-dibromopropyl)phosphate, dibromoisopropylphosphite, bis(1,3-dibromo-2-propyl)2,3-dibromopropyl phosphate, tris(1,3-dibromo-2-propyl)phosphite, bis(2-bromopropyl)-2-bromopropyl phosphonate, trishalogenated propyl phosphate, dioctylphthalate, diisodecyl phthalate, and a compound represented by the formula

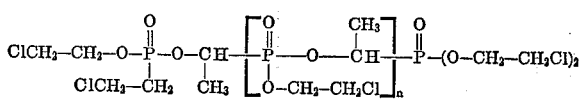

wherein n has a value of from 0 to about 6 and an average value of about 3;

wherein components (A) and (B) are present in quantities so as to provide an NCO:OH weight ratio of from about 0.8:1 to about 1.3:1 and preferably from about 0.9:1 to about 1.1:1.

Suitable primary-hydroxyl containing triols which are suitably employed as component (A) include the reaction products of glycerine, trimethylolpropane or mixtures thereof with a 1,2-alkylene oxide having from 2 to about 4 carbon atoms or a mixture of such alkylene oxides and subsequently endcapping the resultant polyol with at least 1 mole of ethylene oxide per hydroxyl group and wherein the resultant end-capped triol has an average molecular weight of from about 3000 to about 7000 and preferably from about 4000 to about 6000. The primary-hydroxyl containing polyether polyol usually contains from about 4 to about 20% by weight of ethylene oxide on the end of the molecule.

Suitable organic polyisocyanates which are employed in admixture with the toluenediisocyanate include any such isocyanate which does not contain a substituent group which is capable of reacting with the polyether triol. Suitable such isocyanates include polymethylene polyphenylisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
4,4'-diisocyanatodibenzyl,
9,10-anthracenediisocyanate,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443;

and the organic triisocyanates which are described in U.S. Pat. No. 2,929,794.

Suitable auxiliary blowing agents include aliphatic hydrocarbons boiling below 110° C. or halogenated aliphatic hydrocarbons boiling below 110° C. such as dichlorodifluoromethane, trichlorofluoromethane, hexane, hexene, or pentane as the bolwing or foaming agent. Suitable foaming agents are disclosed in U.S. Pat. No. 3,072,582.

Suitable tertiary amine catalysts include, for example, triethylenediamine, N-ethylmorpholine, N(dimethylaminoethyl) piperazine, N,N' - bis(dimethylaminoethyl) piperazine, tetramethyl butanediamine, dimethylethanolamine, tris(2 - dimethylaminomethyl) ether, mixtures thereof and the like.

Organotin catalysts such as stannous octoate, dibutyltindilaurate may also be employed together with the tertiary amine catalyst, but no specific benefit is apparently derived therefrom.

Inorganic and organic fillers such as, for example, calcium carbonate, barytes, sand, expandable polystyrene beads, and the like may be included in the foams of the present invention.

The following examples are illustrative of the present invention, but are not to be construed as to limiting the scope thereof in any manner.

In each of the following examples, components (A), (C), (E), (F), (G) and (H) were blended together until the components were equally dispersed. Then the isocyanate, component (B), was quickly added and after stirring for several seconds the mixture was poured into a box or mold and the mixture allowed to foam.

The composition and the physical properties of the foams are given in Table I.

TABLE I

| | Comparative Exp. A | Ex. 1 | Ex. 2 | Ex. 3 | Ex. 4 | Comparative Exp. B | Ex. 5 | Ex. 6 | Comparative Exp. C | Ex. 7 | Ex. 8 | Ex. 9 | Ex. 10 | Ex. 11 | Ex. 12 |
|---|---|---|---|---|---|---|---|---|---|---|---|---|---|---|---|
| Component A, type/parts (polyol) | A/100 | A/100 | A/100 | A/100 | A/100 | A/100 | A/100 | A/100 | A/100 | A/100 | A/100 | A/100 | A/100 | A/100 | A/100 |
| Component B, type/parts (isocyanate) | A/36.4 | A/36.4 | A/36.4 | A/36.4 | A/36.4 | A/32.7 | A/32.7 | A/32.7 | A/33 | A/33 | A/32.7 | A/33 | A/33 | A/33 | A/33 |
| Component C, parts (water) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Component E, parts [4,4'-methylenebis(2-chloroaniline)] | A/1.5 B/0.2 | A/1.5 B/0.2 | A/1.5 B/0.2 | A/1.5 B/0.2 | A/1.5 B/0.2 | A/1.5 B/0.2 | A/1.5 B/0.2 | A/1.5 B/0.2 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 |
| Component F, type/parts (catalyst) | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 |
| Component G, type/parts (cell control agent) | 0 | A/1 | A/3 | A/5 | A/10 | 0 | C/5 | C/10 | | D/5 | D/10 | E/5 | E/10 | F/15 | F/10 |
| Component H, type/parts (modifier) | 2.39 | 2.45 | 2.41 | 2.46 | 2.46 | 2.38 | 2.51 | 2.71 | 2.43 | 2.50 | 2.59 | 2.63 | 2.73 | 2.47 | 2.60 |
| Density, lbs./cu. ft. | 18.8 | 19.2 | 18.4 | 19.4 | 18.5 | 16.7 | 20.9 | 21.8 | 13.7 | 18.8 | 16.8 | 17.8 | 21.0 | 14.0 | 14.2 |
| Tensile, p.s.i. | 219 | 201 | 228 | 246 | 235 | 248 | 312 | 313 | 206 | 290 | 281 | 263 | 293 | 235 | 233 |
| Elongation, percent | 1.86 | 2.08 | 2.21 | 2.15 | 2.35 | 1.98 | 3.40 | 4.06 | 1.71 | 3.06 | 3.10 | 3.69 | 3.73 | 1.93 | 1.87 |
| Resiliency, percent | 58 | 59 | 59 | 58 | 58 | 60 | 60 | 58 | 55 | 51 | 50 | 51 | 50 | 51 | 56 |
| CLD[1]: 25% | .187 | .22 | .23 | .24 | .256 | | | | | | | | | | |
| 65% | .57 | .66 | .64 | .64 | .69 | | | | | | | | | | |
| ILD[3]: 25% | | | | | | 13 | 20 | 22.5 | 14.5 | 18.5 | 19.0 | 20.5 | 22 | 13.0 | 13.5 |
| 65% | | | | | | 32.5 | 47.5 | 54.0 | 37.5 | 43.0 | 32.75 | 50 | 53 | 32.0 | 32.0 |
| Modulus[2] | 3.04 | 3.0 | 2.78 | 2.67 | 2.70 | 2.5 | 2.38 | 2.4 | 2.58 | 2.32 | 2.30 | 2.44 | 2.41 | 10.5 | 11.0 |

| | Ex. 13 | Ex. 14 | C-1 | C-2 | C-3 | C-4 | C-5 | C-6 | Ex. 15 | Ex. 16 | Ex. 17 | Ex. 18 | Comparative Exp. D | Ex. 19 | Ex. 20 |
|---|---|---|---|---|---|---|---|---|---|---|---|---|---|---|---|
| | | | | | Comparative experiments | | | | | | | | | | |
| Component A, type/parts (polyol) | A/100 | A/100 | A/100 | A/100 | A/100 | A/100 | A/100 | A/100 | A/100 | A/100 | A/100 | A/100 | A/100 | A/100 | A/100 |
| Component B, type/parts (isocyanate) | A/33 | A/33 | A/33 | A/33 | A/33 | A/33 | A/33 | A/33 | A/33 | A/33 | A/32.7 | A/32.7 | A/32.7 | A/32.7 | A/32.7 |
| Component C, parts (water) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Component E, parts [4,4'-methylenebis(2-chloroaniline)] | A/2.0 B/0.2 C/0.27 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 | A/2.0 B/0.2 C/0.2 | B/0.15 C/0.15 D/0.10 | B/0.15 C/0.15 E/0.10 | A/1.3 B/0.15 C/0.15 | A/1.3 B/0.15 C/0.15 | A/1.5 B/0.2 C/0.2 | A/1.5 B/0.2 C/0.2 | A/1.5 B/0.2 C/0.2 |
| Component F, type/parts (catalyst) | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 | A/0.02 |
| Component G, type/parts (cell control agent) | G/5 | G/10 | | B/10 | H/5 | H/10 | I/5 | I/10 | A/3 | A/3 | J/5 | J/10 | 0 | K/5 | K/10 |
| Component H, type/parts (modifier) | 2.35 | 2.57 | 2.54 | 2.58 | 2.43 | 2.49 | 2.41 | 2.57 | 2.67 | 2.69 | 2.24 | 2.49 | 2.23 | 2.54 | 4.72 |
| Density, lbs./cu. ft. | 16.4 | 14.9 | 14.3 | 13.6 | 18.8 | 12.6 | 15.3 | 16.8 | 17.9 | 20.9 | 14.2 | 16.9 | 15.9 | 17.8 | 17.5 |
| Tensile, p.s.i. | 257 | 243 | 229 | 234 | 235 | 245 | 252 | 236 | 222 | 214 | 198 | 237 | 196 | 266 | 271 |
| Elongation, percent | 2.04 | 2.31 | 1.72 | 1.73 | 1.67 | 1.81 | 2.00 | 1.61 | 1.92 | 2.29 | 1.91 | 2.32 | 1.62 | 3.04 | 2.72 |
| Tear strength[4], lbs./in. | 55 | 60 | 55 | 53 | 55 | 50 | 55 | 51 | 65 | 65 | >50 | >50 | 63 | 60 | 59 |
| Resiliency, percent | | | | | | | | | | | | | | | |
| ILD[3]: 25% | 14.5 | 15.0 | 14.5 | 14.2 | 14.2 | 14.0 | 16.0 | 18.0 | 21.0 | 22.5 | 15.0 | 16.5 | 12.5 | 20.0 | 23.0 |
| 65% | 34.0 | 35.5 | 37.0 | 34.0 | 33.5 | 32.5 | 35.5 | 42.0 | 60.0 | 63.0 | 35.5 | 30.5 | 32.5 | 45.5 | 51.0 |
| Modulus[2] | 11.5 | 2.36 | 2.55 | 2.39 | 2.36 | 2.32 | 2.21 | 2.33 | 2.86 | 2.85 | 2.37 | 2.39 | 2.60 | 2.27 | 2.21 |

[1] CLD is Compression Load Deflection at 25% and 65% by ASTM D-1564-71.
[2] Modulus is the 65% CLD:25% CLD or 65% ILD:25% ILD
[3] ILD is Indentation Load Deflection at 25% and 65% by ASTM D-1564-71.
[4] Tear strength was determined by ASTM D-1564-71.

The polyols employed in the examples and comparative experiments as component (A) were as follows:

Polyol A was the reaction product of glycerine with propylene oxide and end-capped with ethylene oxide. The polyol had an OH equivalent weight of about 1650 and contained from about 13 to about 15 percent by weight of ethylene oxide end capping.

The polyisocyanates employed as component (B) in the examples and comparative experiments were as follows:

Polyisocyanate A was an 80/20 mixture of the 2,4-/2,6-isomers of toluene diisocyanate having an NCO equivalent weight of about 87.

The catalysts employed in the examples and comparative experiments were as follows:

Catalyst A and N-ethylmorpholine.
Catalyst B was bis(2-dimethylaminoethyl)ether.
Catalyst C was a 33% solution of triethylene diamine in dipropylene glycol.
Catalyst D was N(dimethylaminoethyl) N' - methylpiperazine.
Catalyst E was a mixture composed of (A) 60% by weight of a mixture composed of (1) 25% by weight of N(dimethylaminoethyl)N'-methylpiperazine,
(2) 68% of N,N'(bisdimethylaminoethyl)piperazine and
(3) 7% of N,N,N',N'(tetramethyl)1,4 - butanediamine, and (B) 40% by weight of dimethylethanolamine.

The cell control agent employed in the examples and comparative experiments was as follows:

Cell control agent A was a dimethyl siloxane polymer having a viscosity at 77° F. of 5.0 centistokes.

The tear and/or tensile strength improving compounds employed as modifiers in the examples were as follows:

Modifier A was tris(2,3-dibromopropyl)phosphate
Modifier C was tris(1,3-dibromo-2-propyl)phosphite.
Modifier D was a compound represented by the formula

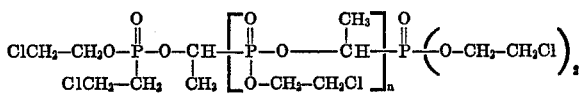

wherein $n$ has a value of from 0 to about 6 and an average value of about 3, commercially available from Monsanto Company as Phosgard® C-22-R and has the following typical properties:

Refractive Index at 25° C.=1.492–1.494
Specific gravity 2 25°/25° C.=1.425–1.445
Viscosity at 210° F.=55–85 centipoise
Percent chlorine=27%
Percent phosphorus=15%

Modifier E was bis(1,3-dibromo-2-propyl)2,3-dibromopropylphosphate.
Modifier F was dioctylphthalate.
Modifier G was diisodecylphthalate.
Modifier J was a tris-halogenated propyl phosphate commercially available from Michigan Chemical Corporation as Firemaster® T13P having the following typical properties:

Specific gravity 2 25°/25° C.=1.88
Viscosity at 25° C.=1928 centistokes
Refractive Index=1.540
pH=6.4
Percent chlorine=18.9
Percent bromine=42.5
Percent phosphorus=5.5

Modifier K was bis(2-bromopropyl)-2-bromopropyl phosphonate.

The following compounds which were phosphorus-containing compounds which do not improve the tear strength of the foams which were employed in the comparative experiments were as follows:

Modifier B was tris(2,3-dichloropropyl)phosphate.
Modifier H was tris(2-chloroethyl)phosphate.
Modifier I was triethylphosphate.

The present invention, i.e. the improvement in tear strength in highly resilient flexible polyurethane foams is demonstrated by comparing Examples 1, 2, 3 and 4 with Comparative Experiment A; Examples 5 and 6 with Comparative Experiment B; Examples 7, 8, 9, 10, 11, 12, 13 and 14 with Comparative Experiment C; and Examples 17, 18, 19 and 20 with Comparative Experiment D. A comparison of Comparative Experiment C-1, C-2, C-3, C-4, C-5 and C-6 with Comparative Experiment C demonstrates that not all halogenated phosphorus compounds can be employed to improve the tear strength of highly resilient, flexible, polyurethane foams.

We claim:
1. A flexible polyurethane foam having a resiliency greater than about 50%, a modulus of at least about 2.3 and improved tear strength resulting from subjecting to foaming conditions a composition which comprises
  (A) a primary hydroxyl-containing polyether triol having a molecular weight of from about 3000 to about 7000,
  (B) an organic polyisocyanate consisting of
    (1) from about 90 to about 100% by weight of 2,4-toluenediisocyanate, 2,6-toluenediisocyanate or mixtures thereof and
    (2) from about 0 to about 10% by weight of an organic polyisocyanate having an NCO functionality of at least 2,
  (C) from about 1.5 to about 5 parts of water per 100 parts of component (A),
  (D) from about 0 to about 20 parts of a low boiling auxiliary blowing agent per 100 parts by weight of component (A),
  (E) at least 2 parts of 4,4'-methylenebis(2-chloroaniline) per 100 parts by weight of component (A),
  (F) from about 0.5 to about 4 parts by weight per 100 parts of component (A) of a tertiary amine catalyst,
  (G) from about 0.005 to about 1.5 parts by weight per 100 parts of component (A) of a silicone oil cell control agent,
  (H) from about 0.5 to about 15 parts by weight per 100 parts of component (A) of a tear-strength improving modifier compound selected from the group consisting of tris(2,3-dibromopropyl)phosphate, dibromoisopropylphosphite, bis(1,3 - dibromo-2-propyl)2,3-dibromopropyl phosphate, tris(1,3-dibromo-2-propyl)phosphite, bis( 2- bromopropyl)-2-bromopropyl phosphonate, trishalogenated propyl phosphate containing about 42.5% bromine and about 18.9% chlorine, dioctylphthalate, diisodecyl phthalate and a compound represented by the formula

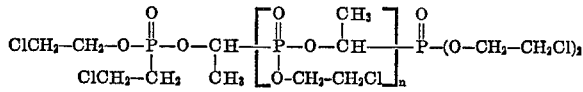

wherein $n$ has a value of from 0 to about 6 and an average value of about 3;
wherein components (A) and (B) are present in quantities so as to provide an NCO:OH ratio of from about 0.8:1 to about 1.3:1.

2. The flexible polyurethane foam of claim 1 wherein the tertiary amine catalyst is selected from the group consisting of triethylenediamine, N-ethylmorpholine, N(dimethylaminoethyl)piperazine, N - methylpiperazine, N,N'-bis(dimethylaminoethyl)piperazine, tetramethyl butane diamine, dimethylethanolamine, tris(2-dimethylaminoethyl)ether and mixtures thereof.

3. The flexible polyurethane foam of claim 2 wherein the quantity of component (D) is zero, the quantity of component (E) is from about 3 to about 5 parts, component (H) is present in quantities of from about 3 to about 5 parts and wherein the NCO:OH ratio of components (A) and (B) is from about 0.9:1 to about 1.1:1.

4. The polyurethane foam of claim 3 wherein the catalyst is a mixture of N-ethylmorpholine, bis(2-dimethylaminoethyl)ether and triethylene diiamine.

5. The polyurethane foam of claim 3 wherein the catalyst is a mixture of N-ethylmorpholine and bis(2-dimethylaminoethyl)ether.

6. The polyurethane foam of claim 3 wherein the catalyst is a mixture of bis(2-dimethylaminoethyl)ether, triethylene diamine and N(dimethylaminoethyl)N'-methylpiperazine.

7. The polyurethane foam of claim 3 wherein the catalyst is a mixture of bis(2-dimethylaminoethyl)ether, triethylene diamine, N(dimethylaminoethyl)N'-methylpiperazine, N,N' (bisdimethylaminoethyl)piperaizne, N,N,N',N'(tetramethyl)1,4-butanediamine and the dimethyethanolamine.

8. The polyurethane foam of claim 4 wherein the polyisocyanate is toluene diisocyanate.

References Cited
UNITED STATES PATENTS

| | | | |
|---|---|---|---|
| 3,171,819 | 3/1965 | Powanda | 260—2.5 AJ |
| 3,400,085 | 9/1968 | Kujawa et al. | 260—2.5 AJ |
| 3,075,927 | 1/1963 | Lanham | 260—2.5 AJ |
| 3,635,851 | 1/1972 | Hoeschele | 260—2.5 AM |

DONALD E. CZAJA, Primary Examiner

M. J. WELSH, Assistant Examiner

U.S. Cl. X.R.

260—2.5 AC, 2.5 AB, 2.5AR, 2.5 AJ, 2.5 AL, 2.5 AM, 2.5 AP

UNITED STATES PATENT OFFICE
CERTIFICATE OF CORRECTION

Patent No. 3,772,222     Dated November 13, 1973

Inventor(s) Collins W. Steward et al.

It is certified that error appears in the above-identified patent and that said Letters Patent are hereby corrected as shown below:

Col. 1, line 57, after "preferably" insert --from--.

Col. 3-4, 1st col., line 7, delete "bolwing" and insert --blowing--.

Col. 3-4, 2nd Col., line 10, delete "inclunded" and insert --included--.

Col. 3-4, 3rd Col., line 10, delete "composition" and insert --compositions--.

Col. 3-4, Table I under Ex. 8 opposite ILD, 65%, change "32.75" to --43.75--.

Col. 3-4, Table I under Ex. 13 opposite Component F, change "C/0.27" to --C/0.2--.

Col. 5, line 16, change "and" to --was--.

Col. 7, line 17, change "piperaizne" to --piperazine--.

Col. 7, line 18, change "dimethy-" to --dimethyl- --.

This certificate supersedes Certificate of Correction issued Oct. 29, 1974.

Signed and sealed this 25th day of February 1975.

(SEAL)
Attest:

RUTH C. MASON
Attesting Officer

C. MARSHALL DANN
Commissioner of Patents
and Trademarks